United States Patent
Laitinen et al.

(10) Patent No.: US 7,798,699 B2
(45) Date of Patent: Sep. 21, 2010

(54) LAYERED LIGHT GUIDE WITH DIFFRACTIVE STRUCTURES

(75) Inventors: Pauli Laitinen, Helsinki (FI); Max Lindfors, Helsinki (FI); Lea Myyryläinen, Espoo (FI); Pasi Tapani Laakkonen, Ruspp (FI)

(73) Assignee: Nokia Corporation, Espoo (FI)

( * ) Notice: Subject to any disclaimer, the term of this patent is extended or adjusted under 35 U.S.C. 154(b) by 152 days.

(21) Appl. No.: 12/291,504

(22) Filed: Nov. 10, 2008

(65) Prior Publication Data
US 2010/0118403 A1 May 13, 2010

(51) Int. Cl.
*F21V 7/04* (2006.01)
(52) U.S. Cl. .................. 362/616; 362/612; 362/613; 362/619; 349/65; 349/68
(58) Field of Classification Search ............ 349/65, 349/68; 362/612, 613, 616, 617, 618, 619, 362/620
See application file for complete search history.

(56) References Cited

U.S. PATENT DOCUMENTS

| | | | |
|---|---|---|---|
| 7,192,175 B2 * | 3/2007 | Parikka et al. | 362/606 |
| 7,246,932 B2 * | 7/2007 | Burtsev et al. | 362/616 |
| 7,534,026 B2 * | 5/2009 | Uehara et al. | 362/613 |
| 7,614,758 B2 * | 11/2009 | Takahashi | 362/616 |

* cited by examiner

*Primary Examiner*—Stephen F Husar
(74) *Attorney, Agent, or Firm*—Ware, Fressola, Van Der Sluys & Adolphson, LLP (57) ABSTRACT

A layered light guide structure has a number of planar light guides arranged in a stack to receive a number of different color light beams from the edge of the light guides. Each of the planar light guides has one or more diffractive structures imparted or provided on its upper surface. The diffractive structures on each light guide are configured to diffract light of a particular wavelength range so that they efficiently diffract the guided light within that light guide. The diffractive structure can be one or more keypad symbols such that the layered light guide structure can be used as a keypad. The symbols can be pixelized such that the pixels can have different color patterns. The diffractive structure can also be a simple patch so that the layered light guide structure can be used as a back-light source.

22 Claims, 5 Drawing Sheets

LAYERED LIGHT GUIDE WITH DIFFRACTIVE STRUCTURES

FIELD OF THE INVENTION

The present invention relates to a layered light guide having diffractive structures which can be used as a keypad or as a light source.

BACKGROUND OF THE INVENTION

A keypad having one or more symbols is commonly used in an electronic device for allowing a user to input information or to select a function, for example. The keypad can be an emissive type in that the symbols on the keypad can be visible without the aid of ambient light. The electronic device can have a display panel, such as a liquid crystal display (LCD). An LCD can be a transmissive or transflective panel such that a backlight source is used to illuminate the LCD panel from the backside thereof.

SUMMARY OF THE INVENTION

The present invention provides a layered light guide structure having two or more light guides arranged to receive a plurality of light beams with different colors or wavelength ranges. Each of the light guides has one or more diffractive structures imparted or provided on its upper surface, for example. The diffractive structures on each light guide are configured to efficiently diffract the guided light within that light guide. The diffractive structures on each light guide are designed to diffract light of a particular wavelength range.

The first aspect of the present invention is an apparatus, which comprises:

a layered light guide structure; and a light source arranged for providing light to the layered light guide structure, the light source comprising a first color light beam of a first wavelength range, and a second color light beam of a different second wavelength range, wherein the layered light guide structure comprises:

a first light guide and a second light guide in a stacked arrangement, wherein the first light guide comprises a first surface, an opposing second surface and an edge surface joining the first surface and the second surface, the edge surface arranged to receive the first color light beam into the first light guide for forming a first guided beam, the first light guide comprising a first diffractive structure located on the first surface, the first diffractive structure configured to diffract part of the first guided beam out of the first light guide away from the first surface for forming a first diffracted beam along an illumination direction; and the second light guide comprises a first surface, an opposing second surface and an edge surface joining the first surface and the second surface, the first surface of the second light guide facing the second surface of the first light guide, the edge surface of the second light guide arranged to receive the second color light beam into the second light guide for forming a second guided beam, the second light guide comprising a second diffractive structure located on the first surface of the second light guide, the second diffractive structure configured to diffract part of the second guided beam out of the second light guide for forming a second diffracted beam through the first light guide along the illumination direction, the first diffracted beam and the second diffracted beam forming a combined diffracted beam, wherein the first color light beam and the second color light beam are independently adjustable for changing color of the combined diffracted beam.

According to one embodiment of the present invention, the light source further comprises a third color light beam of a third wavelength range different from the first wavelength range and the second wavelength range, and the layered light guide structure further comprises:

a third light guide in the stacked arrangement, wherein the third light guide comprises a first surface, an opposing second surface and an edge surface joining the first surface and the second surface, the edge surface arranged to receive the third color light beam into the third light guide for forming a third guided beam, the first surface of the third light guide facing the second surface of the second light guide, the third light guide comprising a third diffractive structure located on the first surface of the third light guide, the third diffractive structure configured to diffract part of the third guided beam out of the third light guide for forming a third diffracted beam through the second light guide and then through the first light guide along the illumination direction such that the third diffracted beam becomes part of the combined diffracted beam, wherein the third color light beam is also independently adjustable for changing the color of the combined diffracted beam.

According to various embodiments of the present invention, the first wavelength range is part of a red color wavelength range, the second wavelength range is part of a green color wavelength range, and the third wavelength range is part of a blue color wavelength range.

According to one embodiment of the present invention, the first diffractive structure comprises a first pattern, representing a keypad symbol and the second diffractive structure comprises a second pattern substantially the same as the first pattern.

According to another embodiment of the present invention, the first diffractive structure comprises a first pattern, representing a symbol on a keypad, the second diffractive structure comprises a second pattern substantially the same as the first pattern, and the third diffractive structure comprises a third pattern substantially the same as the first pattern.

According to yet another embodiment of the present invention, the first diffractive structure comprises a first pattern, representing a symbol on a keypad, the second diffractive structure comprises a second pattern substantially the same as the first pattern, and the third diffractive structure comprises a third pattern different from the first pattern.

According to a different embodiment of the present invention, the first diffractive structure comprises a plurality of first diffractive structure segments, and the second diffractive structure comprises a plurality of second diffractive structure segments, arranged such that the combined diffracted beam forms a keypad symbol.

According to yet another embodiment of the present invention, the first diffractive structure comprises a plurality of first diffractive structure segments, the second diffractive structure comprises a plurality of second diffractive structure segments, and the third diffractive structure comprises a plurality of third diffractive structure segments, arranged such that the combined diffracted beam forms a keypad symbol. The first diffractive structure segments are arranged in a first pattern and the second diffractive structure segments are arranged in a second pattern at least partially different from the first pattern. The third diffractive structure segments are arranged in a third pattern at least partially different from the first pattern.

According to various embodiments of the present invention, the illumination direction is substantially perpendicular to the first surface of the first light guide. Each of the first diffractive structure, the second diffractive structure and the third diffractive structure comprises a slanted grating structure.

The layered light guide structure, according to various embodiment of the present invention, can be integrated into an electronic device, wherein the electronic device comprises a keypad, at least part of the keypad comprises a layered light guide structure, and a light source arranged for providing light to the layered light guide structure.

The layered light guide structure, according to various embodiment of the present invention, can be integrated into an electronic device, wherein the electronic device comprises a display panel, and a backlight module arranged to provide illumination to the display panel, where the backlight source having a layered light guide structure and a light source arranged for providing light to the layered light guide structure. The electronic device can be a mobile terminal, for example.

The second aspect of the present invention is a method, which comprises:

providing a layered light guide structure;

positioning a light source in relationship to the layered light guide structure for providing light to the layered light guide structure, the light source comprising a first color light beam of a first wavelength range, a second color light beam of a different second wavelength range, and a third color light beam of a third wavelength range different from the first wavelength range and the second wavelength range; and adjusting at least one of the first, second and third light beams independently of each other, said providing comprising:

arranging a first light guide, a second light guide and a third light guide in a stacked structure, wherein each of the first light guide and the second light guide comprises a first surface, an opposing second surface and an edge surface joining the first surface and the second surface, and wherein the edge surface of the first light guide is arranged to receive the first color light beam into the first light guide for forming a first guided beam, the edge surface of the second light guide is arranged to receive the second color light beam into the second light guide for forming a second guided beam, and the edge surface of the third light guide is arranged to receive the third color light beam into the third light guide for forming a third guided beam; and wherein the first light guide comprises a first diffractive structure located on the first surface of the first light guide, the first diffractive structure configured to diffract part of the first guided beam out of the first light guide away from the first surface for forming a first diffracted beam along an illumination direction, the second light guide comprises a second diffractive structure located on the first surface of the second light guide, the second diffractive structure configured to diffract part of the second guided beam out of the second light guide for forming a second diffracted beam through the first light guide along the illumination direction, and the third light guide comprises a third diffractive structure located on the first surface of the third light guide, the third diffractive structure configured to diffract part of the third guided beam out of the second light guide for forming a third diffracted beam through the second light guide and then the first light guide along the illumination direction for forming a combined diffracted beam with the first diffracted beam and the second diffracted beam, wherein color of the combined diffracted beam is changeable by said adjusting.

The present invention will become apparent upon reading the description taken in conjunction with FIGS. 1 to 11.

DETAILED DESCRIPTION OF THE INVENTION

Figure 1:
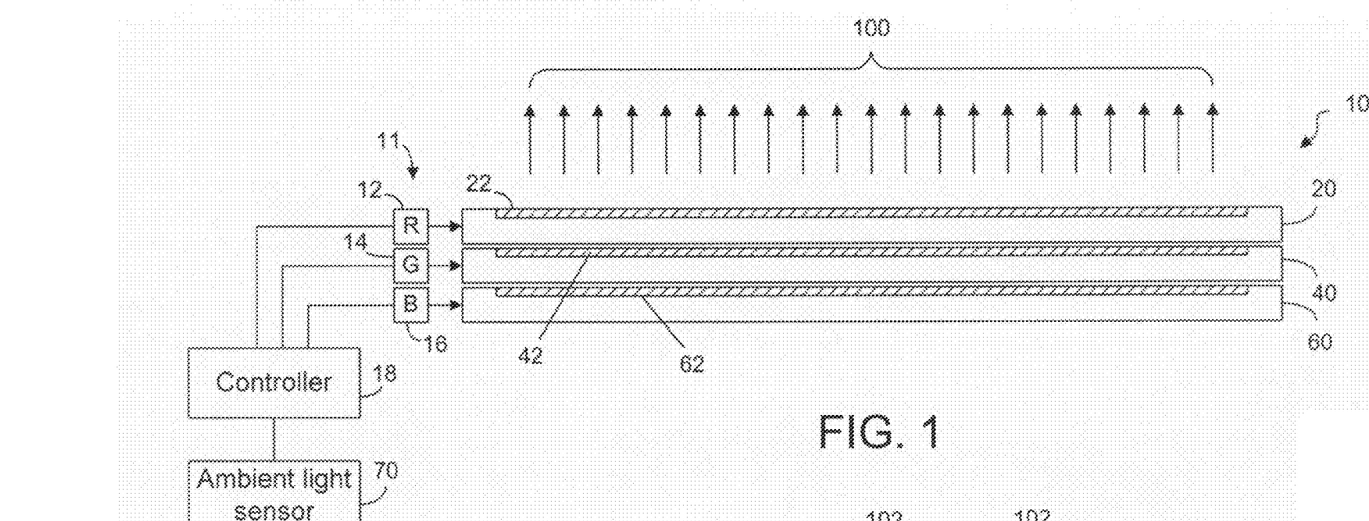
FIG. 1 shows a layered light guide with diffractive structures, according to one embodiment of the present invention.

The present invention is concerned with a layered light guide structure having two or more light guides arranged to receive a plurality of light beams with different colors or wavelength ranges. Each of the light guides has one or more diffractive structures imparted or provided on its upper surface, for example. The diffractive structures on each light guide are configured to efficiently diffract the guided light within that light guide. This means that the diffractive structures on each light guide are designed to diffract light of a particular wavelength range. An exemplary layered light guide structure of the present invention is shown in FIG. 1. As shown in FIG. 1, the light guide structure 10 comprises three light guides 20, 40 and 60 placed one on top of another. The light guide structure 10 is arranged to receive a plurality of light beams from a light source 11 with three color light sources 12, 14 and 16. Each light guide is arranged to receive a light beam from one of its edge surfaces. As shown, the light guide 20 is arranged to receive a red light beam from the red light source 12, the light guide 40 is arranged to receive a green light beam from the green light source 14, and the light guide 60 is arranged to separately receive a blue light beam from the blue light source 16. The light sources 12, 14 and 16 are connected to a controller 18 so that the light beams from the light sources 12, 14 and 16 can be separately adjusted according to ambient light conditions, for example. Each of the light guides 20, 40 and 60 has a diffractive structure (22, 42, 62) on its upper surface. The diffractive structure 22 is designed to efficiently diffract red light, the diffractive structure 42 is designed to efficiently diffract green light and the diffractive structure 62 is designed to efficiently diffract blue light, for example. The light guides 20, 40 and 60 can be similarly constructed except that the diffraction characteristics of the diffractive structures 22, 42 and 62 are different and the size and shape of the diffractive structures may be different or the same.

Figure 2:
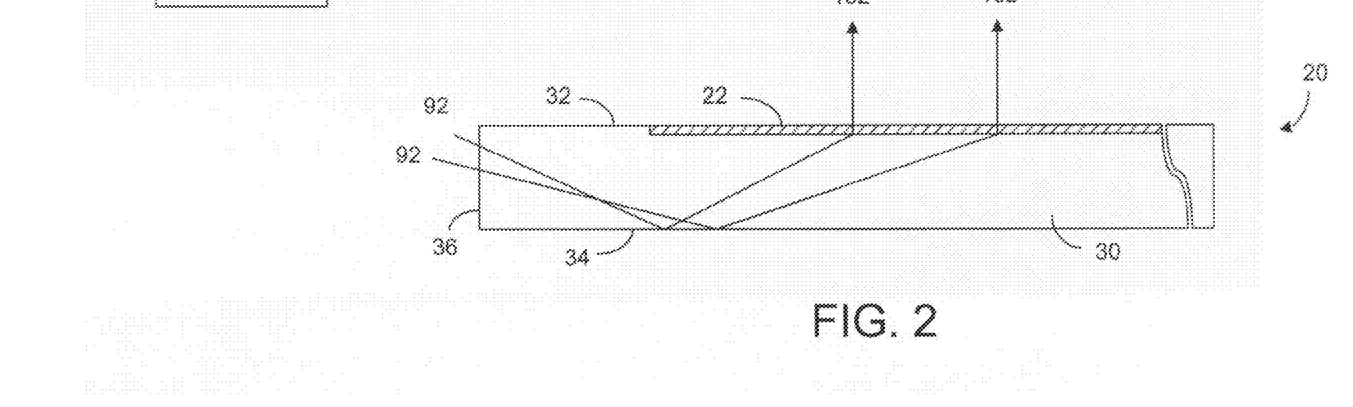
FIG. 2 shows the side view of one layer of the light guide, according to one embodiment of the present invention.

As shown in FIG. 2, the light guide 20 is made of a substantially transparent substrate 30 having a first surface 32, an opposing second surface 34 and an edge surface 36 joining the first and second surfaces. The light guide 20 is arranged to receive a red light beam 92 from the edge surface 36. The input light beam 92 is then guided between the surfaces 32, 34 by total internal reflection (TIR), for example. As a part of the beam 92 encounters the diffractive structure 22, it will be diffracted as a red exit beam 102, directed away from the first surface 32 in a direction substantially perpendicular to the surface 32. Similarly, the light guide 40 can also produce a green exit beam from an input green light beam via the diffractive structure 42, and the light guide 60 can produce a blue exit beam from an input blue light beam via the diffractive structure 62 (see FIG. 1). As the blue exit beam (not shown) goes through the light guide 40 and the light guide 20, the beam intensity may be slightly attenuated by the diffractive structures 42 and 22, and the optical material of light guides 40 and 20. However, the diffractive structures 42 and 22 are designed such that they do not noticeably diffract blue light. Likewise, the diffractive structure 22 is designed such that it does not noticeably diffract green light.

The resultant beam 100 from different exit beams, as shown in FIG. 1, can have different colors depending on the input light beams from the light sources 12, 14 and 16. It is known that the resultant beam 100 appears to be white if the proportion among the input red, green and blue beams is correct. According to various embodiments of the present invention, the input beams can be separately adjusted so that the resultant beam 100 can appear in different colors, such as red, green, blue, magenta, cyan, yellow and other colors in between. The adjustment of the colors can be made based on ambient light conditions, for example. Thus, the controller 18 can be connected to an ambient light detector 70, for example.

Figure 3:
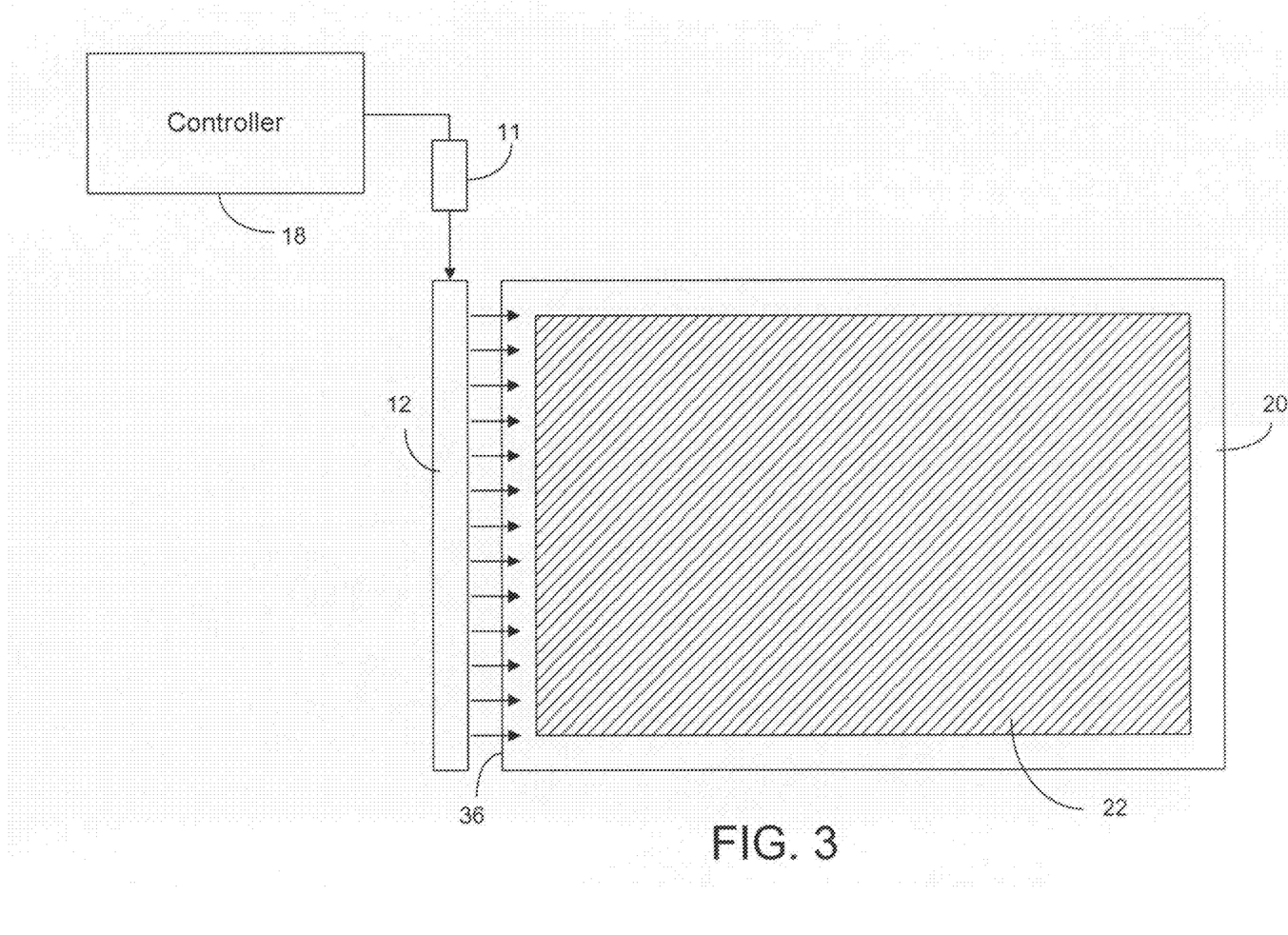
FIG. 3 shows a top view of the light guide, according to one embodiment of the present invention.

A top view of an exemplary light guide 20 is shown in FIG. 3. As shown in FIG. 3, the diffractive structure 22 is rectangular in shape so that the cross section of the exit beam 102 (FIG. 2) is substantially rectangular in shape. The red light source 12 is designed to introduce a light sheet into the edge surface 36. The red light source 12 may comprise a plurality of red light emitting diodes placed behind a lens element to produce the light sheet, for example. Alternatively, a red laser 11 can be used to provide a red laser beam to the light source 12. The light source 12 may comprise a plurality of reflective or diffractive elements to turn the input laser beam into a light sheet, for example. The diffractive structure 42 on the light guide 40 and the diffractive structure 62 on the light guide 60 can be similarly constructed. As such, the layered light guide structure 10 (FIG. 1) can be used as an illumination source, such as a backlight source to be used with a liquid crystal display, for example.

Figure 4:
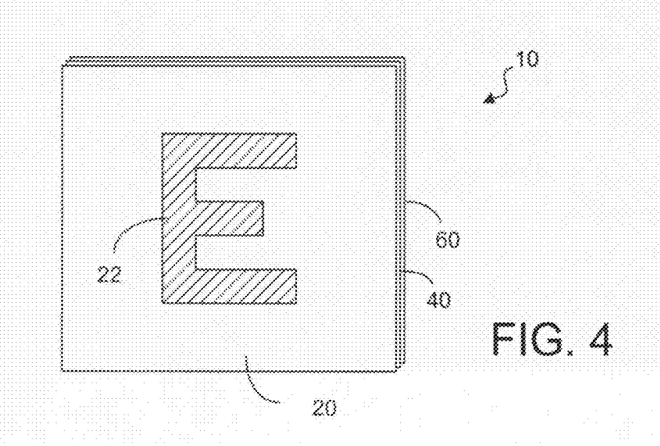
FIG. 4 shows an exemplary keypad having a single symbol, according to one embodiment of the present invention.
Figure 5A:
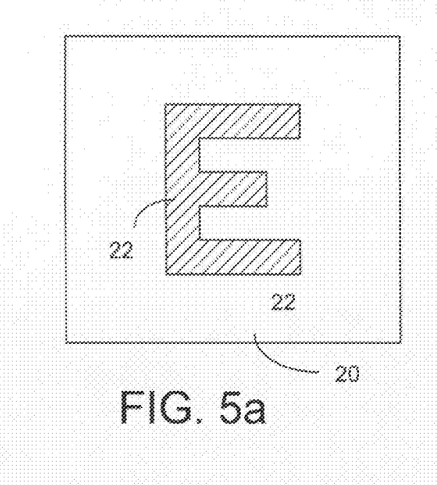
FIGS. 5a-5c shows the different layers of the keypad of FIG. 4.
Figure 5B:
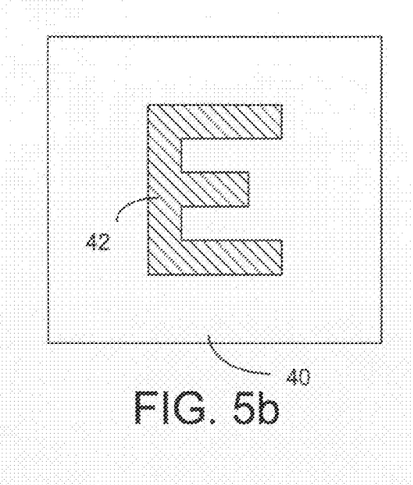
Figure 5C:
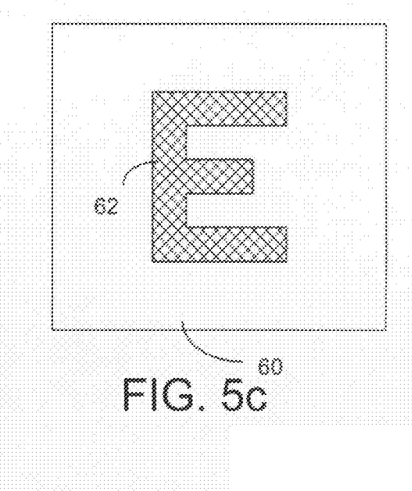

The layered structure 10, according to various embodiment of the present invention, can be used as a keypad to show keypad symbols or graphics. A single keypad symbol is shown in FIG. 4. One or more symbols can be used in an emissive display, for example. By adjusting the input beams to the light guides 20, 40 and 60, the color of the emissive symbol can be changed. The size and shape of the diffractive structures 22, 42 and 62 for the symbol on the light guides 20, 40 and 60 can be identical, as shown in FIGS. 5a to 5c. As such, the exit beams from the diffractive structures 22, 42 and 62 would make the symbol on the layered light guide structure 10 white. By turning off only the blue light from the layered light guide structure 10 (FIG. 4), the symbol would appear yellow, for example.

Figure 5D:
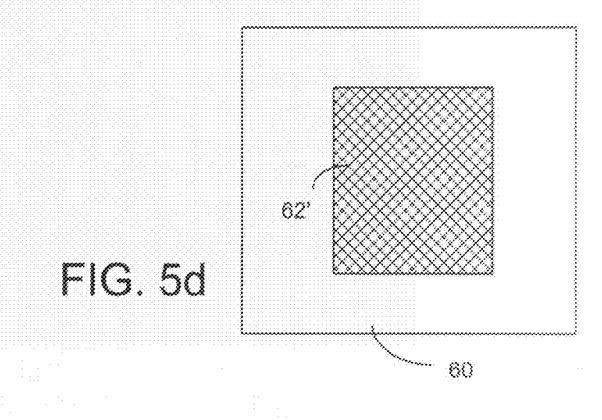
FIG. 5d shows a different layout in one of the layers of the keypad of FIG. 4.

The size and shape of the diffractive structures 22, 42 and 62 for the symbol on the light guides 20, 40 and 60 can be different, as shown in FIGS. 5a, 5b and 5d. As shown in FIG. 5d, the diffractive structure 62' on the light guide 60 is a rectangle. When a layered light guide structure having the diffractive structures 22, 42 (FIGS. 5a and 5b) and the diffractive structure 62' receives all three input beams of red, green and blue, the emissive symbol on the layered light guide structure 10 would appear as a white letter "E" on a blue pad. If the red input beam is turned off, the emissive symbol on the layered light guide structure would appear as a cyan letter "E" on a blue pad.

Figure 6:
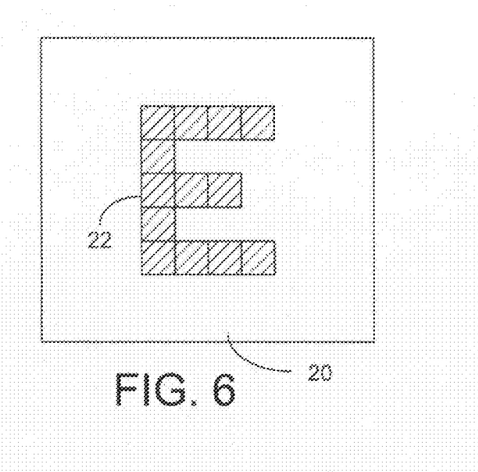
FIG. 6 shows an exemplary keypad having a single symbol, according to another embodiment of the present invention.

According to another embodiment of the present invention, the symbol is pixelized. For example, the symbol "E" can be composed on thirteen rectangular or square pixels, as shown in FIG. 6. If the size, shape and arrangement of the pixels in the diffractive structures in the light guides are the same, then the emissive symbol when some or all of the input beams in red, green and blue are provided would appear the same as the emissive symbol as shown in FIG. 4.

Figure 7A:
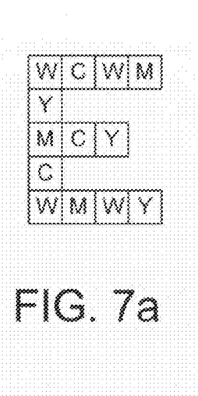
FIGS. 7a-7c show different appearances of a symbol depending on the input light beams.
Figure 7B:
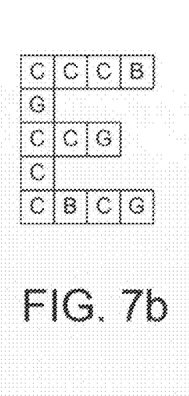
Figure 7C:
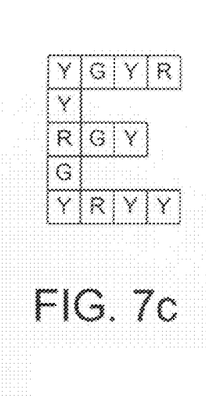

In one embodiment of the present invention, while the size and shape of the pixels in the diffractive structures in the light guides are the same, their arrangements are different. The pixels can be arranged such that when all of the input beams in red, green and blue are provided to the layered light guide structure, the emissive symbol of the layered light guide structure would appear as a letter "E" in many colors, like a mosaic of color tiles as shown in FIG. 7a. When the red light beam is turned off, the same emissive symbol would appear as a letter "E" in different colors, as shown in FIG. 7b. When the blue light beam is turned off, the same emissive symbol would appear as a letter "E" in yet another color pattern, as shown in FIG. 7c. It should be understood that the intensity of each of the input beams in red, green and blue can be independently adjusted, from full intensity to completely off. As such, the color pattern of the same symbol can have more varieties.

Figure 8A:
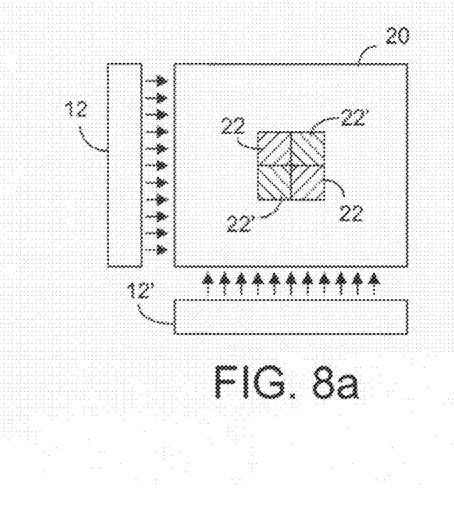
FIGS. 8a-8c show a layer of the light guide, according to a different embodiment of the present invention.
Figure 8B:
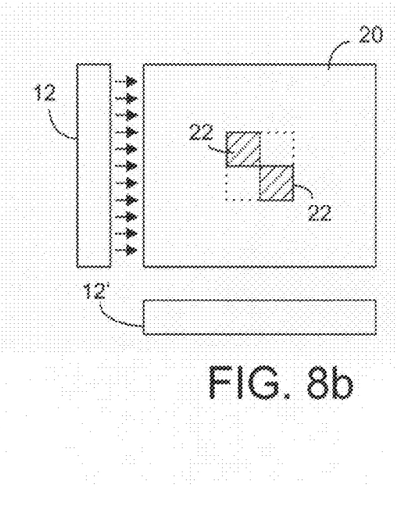
Figure 8C:
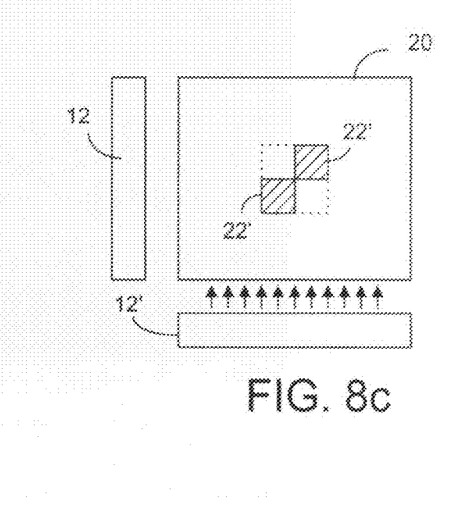

In a different embodiment of the present invention, the diffractive structure of a light guide can have pixels of different diffraction characteristics. For example, on the light guide 20, the diffraction characteristics of the pixels 22 are different from the diffraction characteristics of the pixels 22', as shown in FIG. 8a. The diffractive pixels 22 and 22' can be directionally selective in that pixels 22 diffract more efficiently with the light beam provided from the right edge, whereas pixels 22' diffract more efficiently with the light beam provided from the bottom edge. As such, when only the light beam from the light source 12 is turned on, only the pixels 22 are visible, as shown in FIG. 8b. Similarly, when only the light beam from the light source 12' is turned on, only the pixels 22' are visible, as shown in FIG. 8c.

The diffractive pixels 22 and 22' can also be selective as to wavelengths. For example, pixels 22 diffract more efficiently with a light beam in one color and pixels 22' diffract more efficiently with a light beam in a different color. In yet another embodiment of the present invention, pixel 22 and pixel 22' diffract efficiently with light beams of the same color but in different wavelength ranges. For example, both pixel 22 and pixel 22' diffract efficiently with red light. However, the diffraction efficiency of the pixel 22 is highest in one red wavelength range and the diffraction efficiency of the pixel 22' is highest in another red wavelength range.

Figure 9:
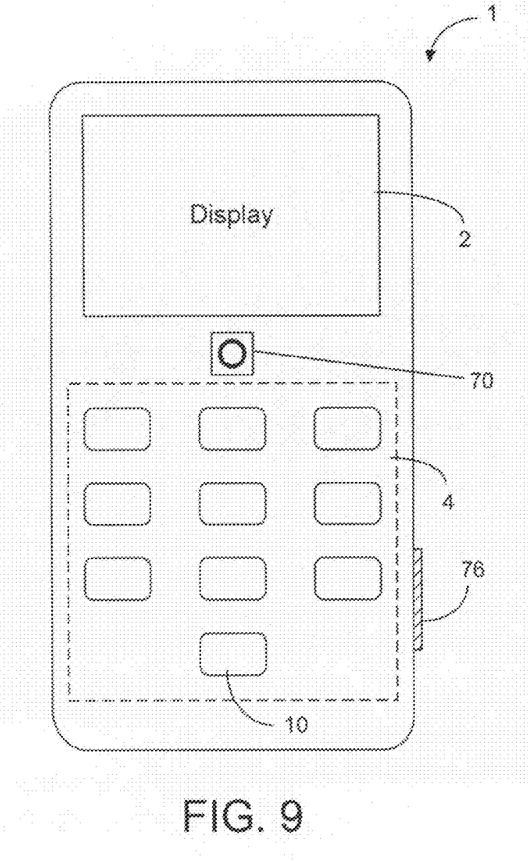
FIG. 9 shows an electronic device having a keypad, according to embodiments of the present invention.

The light guide structure of the present invention can be used in a keypad in an electronic device and can also be used as a backlight source for illuminating a display device or panel, for example. As shown in FIG. 9, an electronic device 1 has a display device 2 and a keypad 4. The keypad 4 has a plurality of light guide structures 10. Each of the light guide structures 10 can be used to show one or more keypad symbols (see FIG. 4, for example). The electronic device 1 also includes an ambient light detector 70 to sense the colors and brightness of ambient light, for example, so that the colors of the emissive keypad symbols on the keypad can be collectively adjusted or separately adjusted. The color adjustment can be automatic according to an algorithm in response to the output signals from the ambient light detector 70. Alternatively, the color adjustment can be controlled by a user through a user interface 76. For example, the user can override the automatic color adjustment, enhance the color adjustment or adjust the color independently of the ambient light detector 70.

Figure 10:
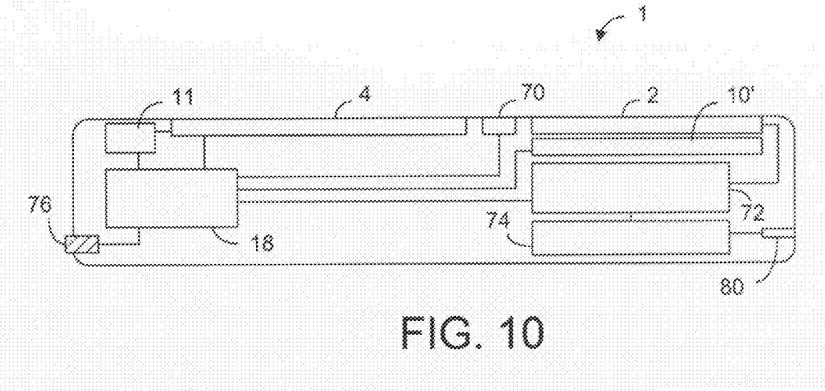
FIG. 10 is a block diagram showing various components in the electronic device of FIG. 9.

FIG. 10 shows an exemplary arrangement of various components in the electronic device of FIG. 9. As shown in FIG. 10, the electronic device 1 includes a controller 18 for controlling the light source 11. The controller 18 is connected to a data/signal processor 72 and the light source 11 can have more than one set of color light sources 12, 14 and 16 and each set of color light sources can be independently controlled for illuminating a light guide structure in the keypad 4. The controller 18 is operatively connected to an ambient light detector 70 and a user interface 76 for color adjustment. The electronic device 1 also includes a display device, such as a liquid crystal display panel 2, and a different light guide structure 10' as used a backlight source to illuminate the display device. The color of the illuminating light from the light guide structure 10' can also be adjusted according to ambient light and/or by the user. The electronic device 1 can be used as a communications apparatus, such as a mobile terminal, having a transceiver 74 for transmitting and receiving signals via an antenna 80, for example.

Figure 11:
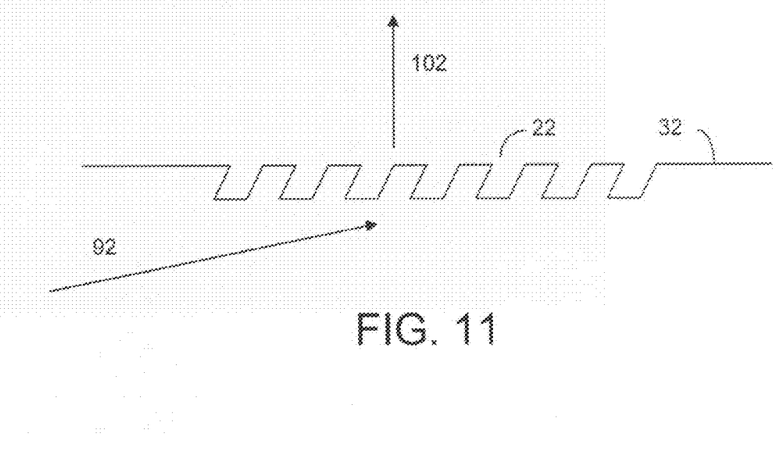
FIG. 11 shows a slanted grating structure for use as the diffractive structures in the layered light guide, according to one embodiment of the present invention.

The diffractive structure on each of the light guide can be imparted on the surface of the light guide in different ways. For example, the diffractive structure can be holographically produced or mechanically produced. As shown in FIG. 11, the diffractive structure 22 is a slanted grating structure imparted on the first surface 32 of the first light guide. The slanted grating structure is configured to diffract part of the guided light beam 92 in the first light guide to form an exit beam 102 away from the first surface 32. The grating or diffractive structure on a light guide is configured to efficiently diffract a guided light beam within that light guide. Since each light guide is arranged to receive a color light beam of a certain wavelength range, the periodicity of the grating structure is tailored for that wavelength range. Thus, the periodicity of the grating structure on each light guide is different from the periodicity of the grating structure on the other light guide in the layered light guide structure. The color light beams can be red, green, blue, separately produced by red, green and blue light emitting diodes, for example. The color light beams can also be produced by red, green and blue lasers.

When the layered light guide is used as a backlight source to provide an illuminating beam to a display device, the color of the illuminating beam can be changed to enhance the colors of the display graphics, for example. In a display device, such as a liquid crystal display device, the surface reflections of day light from the device surface can reduce the visibility of certain emissive graphics. For example, by increasing the amount of green color or blue color in the backlight beam, the blue icons or graphics on the display device can be made more visible in daylight. According to the present invention, the intensity of the green or blue diffracted beam can be adjusted based on ambient light conditions as indicated by an ambient light detector, for example. The intensity of the red diffracted beam can be kept constant, for example. The intensity of the green or blue diffracted beam can also be adjusted by a user.

In sum, the present invention provides a multi-layer planar light-guide structure, configured to receive light from a light source having a red light beam, a green light beam and a blue light beam. The layered planar light guide structure comprises a first light guide, a second light guide and a third light guide in a stacked arrangement, where each of the light guides has a first surface, an opposing second surface and an edge surface joining the first surface and the second surface, the edge surface arranged to receive one color light beam from the light source into the light guide for forming a guided beam. Each of the light guides has a diffractive structure located on the first surface, configured to diffract part of the guided beam out of the light guide away from the first surface for forming a diffracted beam along an illumination direction. The diffracted beams from the light guides form a combined diffracted beam. According to various embodiments of the present invention, the intensity of the color light beams can be independently adjusted for changing color of the combined diffracted beam.

The diffractive structures on the light guides can be the same or different from each other. The diffractive structures on the light guides can have a pattern representing a keypad symbol or a group of patterns representing a plurality of keypad symbols, for example. The diffractive structures can have a plurality of diffractive segments or pixels to form a keypad symbol. The pixel arrangement can be the same on all of the light guides, or can be different from one light guide to another.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. An apparatus, comprising:
  a layered light guide structure; and
  a light source arranged for providing light to the layered light guide structure, the light source comprising a first color light beam of a first wavelength range, and a second color light beam of a different second wavelength range, wherein the layered light guide structure comprises:
  a first light guide and a second light guide in a stacked arrangement, wherein
  the first light guide comprises a first surface, an opposing second surface and an edge surface joining the first surface and the second surface, the edge surface arranged to receive the first color light beam into the first light guide for forming a first guided beam, the first light guide comprising a first diffractive structure located on the first surface, the first diffractive structure configured to diffract part of the first guided beam out of the first light guide away from the first surface for forming a first diffracted beam along an illumination direction; and
  the second light guide comprises a first surface, an opposing second surface and an edge surface joining the first surface and the second surface, the first surface of the second light guide facing the second surface of the first light guide, the edge surface of the second light guide arranged to receive the second color light beam into the second light guide for forming a second guided beam, the second light guide comprising a second diffractive structure located on the first surface of the second light guide, the second diffractive structure configured to diffract part of the second guided beam out of the second light guide for forming a second diffracted beam through the first light guide along the illumination direction, the first diffracted beam and the second diffracted beam forming a combined diffracted beam, wherein the first color light beam and the second color light beam are independently adjustable for changing color of the combined diffracted beam.

2. The apparatus of claim 1, wherein
the light source further comprises a third color light beam of a third wavelength range different from the first wavelength range and the second wavelength range, and wherein the layered light guide structure further comprises:
a third light guide in the stacked arrangement, wherein
the third light guide comprises a first surface, an opposing second surface and an edge surface joining the first surface and the second surface, the edge surface arranged to receive the third color light beam into the third light guide for forming a third guided beam, the first surface of the third light guide facing the second surface of the second light guide, the third light guide comprising a third diffractive structure located on the first surface of the third light guide, the third diffractive structure configured to diffract part of the third guided beam out of the third light guide for forming a third diffracted beam through the second light guide and then through the first light guide along the illumination direction such that the third diffracted beam becomes part of the combined diffracted beam, wherein the third color light beam is also independently adjustable for changing the color of the combined diffracted beam.

3. The apparatus of claim 2, wherein the first wavelength range is part of a red color wavelength range, the second wavelength range is part of a green color wavelength range, and the third wavelength range is part of a blue color wavelength range.

4. The apparatus of claim 1, wherein the first diffractive structure comprises a first pattern, representing a keypad symbol and the second diffractive structure comprises a second pattern substantially the same as the first pattern.

5. The apparatus of claim 2, wherein the first diffractive structure comprises a first pattern, representing a symbol on a keypad, the second diffractive structure comprises a second pattern substantially the same as the first pattern, and the third diffractive structure comprises a third pattern substantially the same as the first pattern.

6. The apparatus of claim 2, wherein the first diffractive structure comprises a first pattern, representing a symbol on a keypad, the second diffractive structure comprises a second pattern substantially the same as the first pattern, and the third diffractive structure comprises a third pattern different from the first pattern.

7. The apparatus of claim 1, wherein the first diffractive structure comprises a plurality of first diffractive structure segments, and the second diffractive structure comprises a plurality of second diffractive structure segments, arranged such that the combined diffracted beam forms a keypad symbol.

8. The apparatus of claim 2, wherein the first diffractive structure comprises a plurality of first diffractive structure segments, the second diffractive structure comprises a plurality of second diffractive structure segments, and the third diffractive structure comprises a plurality of third diffractive structure segments, arranged such that the combined diffracted beam forms a keypad symbol.

9. The apparatus of claim 8, wherein the first diffractive structure segments are arranged in a first pattern and the second diffractive structure segments are arranged in a second pattern at least partially different from the first pattern.

10. The apparatus of claim 9, wherein the third diffractive structure segments are arranged in a third pattern at least partially different from the first pattern.

11. The apparatus of claim 1, wherein the illumination direction is substantially perpendicular to the first surface of the first light guide.

12. The apparatus of claim 2, wherein each of the first diffractive structure, the second diffractive structure and the third diffractive structure comprises a slanted grating structure.

13. An electronic device, comprising:
a keypad, at least part of the keypad comprises a layered light guide structure, and a light source arranged for providing light to the layered light guide structure according to claim 1.

14. An electronic device, comprising:
a display panel, and a backlight module arranged to provide illumination to the display panel, where the backlight source having a layered light guide structure and a light source arranged for providing light to the layered light guide structure according to claim 1.

15. The electronic device of claim 13, comprising a mobile terminal.

16. A method, comprising:
providing a layered light guide structure;
positioning a light source in relationship to the layered light guide structure for providing light to the layered light guide structure, the light source comprising a first color light beam of a first wavelength range, a second color light beam of a different second wavelength range, and a third color light beam of a third wavelength range different from the first wavelength range and the second wavelength range; and
adjusting at least one of the first, second and third light beams independently of each other, said providing comprising:
arranging a first light guide, a second light guide and a third light guide in a stacked structure, wherein
each of the first light guide and the second light guide comprises a first surface, an opposing second surface and an edge surface joining the first surface and the second surface, and wherein
the edge surface of the first light guide is arranged to receive the first color light beam into the first light guide for forming a first guided beam,
the edge surface of the second light guide is arranged to receive the second color light beam into the second light guide for forming a second guided beam, and
the edge surface of the third light guide is arranged to receive the third color light beam into the third light guide for forming a third guided beam; and wherein
the first light guide comprises a first diffractive structure located on the first surface of the first light guide, the first diffractive structure configured to diffract part of the first guided beam out of the first light guide away from the first surface for forming a first diffracted beam along an illumination direction,
the second light guide comprises a second diffractive structure located on the first surface of the second light guide, the second diffractive structure configured to diffract part of the second guided beam out of the second light guide for forming a second diffracted beam through the first light guide along the illumination direction, and the third light guide comprises a third diffractive structure located on the first surface of the third light guide, the third diffractive structure configured to diffract part of the third guided beam out of the second light guide for forming a third diffracted beam through the second light guide and then the first light guide along the illumination direction for forming a combined diffracted beam with the first diffracted beam and the second diffracted beam, wherein color of the combined diffracted beam is changeable by said adjusting.

17. The method of claim 16, wherein the first wavelength range is part of a red color wavelength range, the second wavelength range is part of a green color wavelength range, and the third wavelength range is part of a blue color wavelength range.

18. The method of claim 16, wherein the first diffractive structure comprises a first pattern, representing a symbol on a keypad, the second diffractive structure comprises a second pattern substantially the same as the first pattern, and the third diffractive structure comprises a third pattern substantially the same as the first pattern.

19. The method of claim 16, wherein the first diffractive structure comprises a first pattern, representing a symbol on a keypad, the second diffractive structure comprises a second pattern substantially the same as the first pattern, and the third diffractive structure comprises a third pattern different from the first pattern.

20. The method of claim 16, wherein the first diffractive structure comprises a plurality of first diffractive structure segments, the second diffractive structure comprises a plurality of second diffractive structure segments, and the third diffractive structure comprises a plurality of third diffractive structure segments, arranged such that the combined diffracted beam forms a keypad symbol.

21. The method of claim 20, wherein the first diffractive structure segments are arranged in a first pattern and the second diffractive structure segments are arranged in a second pattern at least partially different from the first pattern.

22. The method of claim 21, wherein the third diffractive structure segments are arranged in a third pattern at least partially different from the first pattern.

* * * * *